(12) United States Patent
Schierbaum

(10) Patent No.: US 6,792,747 B2
(45) Date of Patent: Sep. 21, 2004

(54) TURBO SHAFT ENGINE WITH ACOUSTICAL COMPRESSION FLOW AMPLIFYING RAMJET

(76) Inventor: James R. Schierbaum, 25 Salwey Ct., Newnan, GA (US) 30265

(*) Notice: Subject to any disclaimer, the term of this patent is extended or adjusted under 35 U.S.C. 154(b) by 0 days.

(21) Appl. No.: 10/615,312

(22) Filed: Jul. 8, 2003

(65) Prior Publication Data

US 2004/0006965 A1 Jan. 15, 2004

Related U.S. Application Data

(63) Continuation-in-part of application No. 10/054,501, filed on Jan. 22, 2002, now Pat. No. 6,647,709, which is a continuation-in-part of application No. 09/778,340, filed on Feb. 7, 2001, now Pat. No. 6,457,305.

(51) Int. Cl.[7] ................................................. F02C 3/05
(52) U.S. Cl. ........................... 60/263; 60/269; 60/39.17
(58) Field of Search ........................... 60/262, 263, 264, 60/269, 39.17

(56) References Cited

U.S. PATENT DOCUMENTS

| | | | | |
|---|---|---|---|---|
| 2,404,954 A | * | 7/1946 | Godsey, Jr. | 60/269 |
| 2,641,902 A | * | 6/1953 | Kerr | 60/264 |
| 2,654,215 A | * | 10/1953 | Thompson | 60/264 |
| 2,825,204 A | * | 3/1958 | Marcel et al. | 60/264 |
| 2,882,679 A | * | 4/1959 | Karcher et al. | 60/264 |
| 2,907,536 A | * | 10/1959 | Zborowski | 60/269 |
| 2,955,414 A | * | 10/1960 | Hausmann | 60/264 |
| 3,048,014 A | * | 8/1962 | Schmidt | 60/269 |
| 3,176,462 A | * | 4/1965 | Bruno | 60/262 |
| 3,396,538 A | * | 8/1968 | Wetherbee, Jr. | 60/264 |
| 3,685,287 A | * | 8/1972 | Dooley | 60/39.43 |
| 5,341,640 A | * | 8/1994 | Faulkner | 60/262 |

* cited by examiner

Primary Examiner—Michael Koczo
(74) Attorney, Agent, or Firm—Dale J. Ream

(57) ABSTRACT

A turbo shaft engine for amplifying an air stream flow rate includes a turbine fan assembly and gas generator. The gas generator includes a primary air duct defining intake and outlet ports. A combustion chamber is connected to the primary air duct for igniting an admixture of fuel and a portion of the intake flow to form an energized motive flow. The motive flow is discharged from the combustion chamber back into the primary air duct over a Coanda-profiled guide member so as to amplify the flow rate of incoming intake flow by momentum transfer. A portion of the motive flow is returned directly to the fan assembly for amplifying incoming intake flow. The remaining motive flow is again combusted and used to rotate turbine blades. A resonance chamber with volume adjustment is included for tuning a pulse of intake flow into the primary combustion chamber.

20 Claims, 14 Drawing Sheets

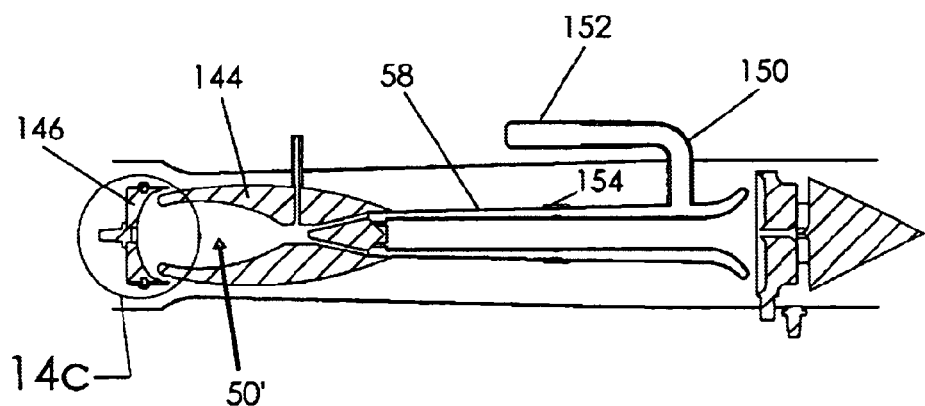
Fig. 14b
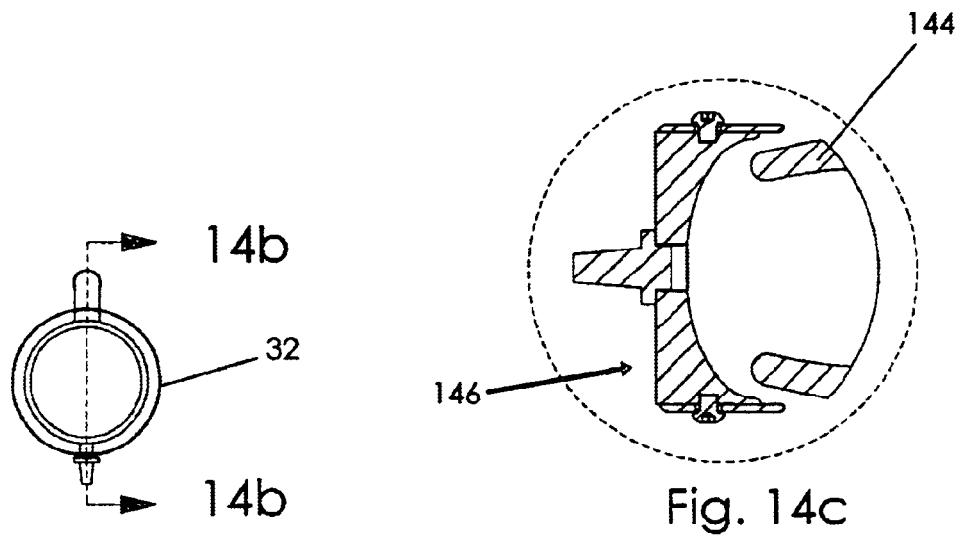
Fig. 14a
Fig. 14c

TURBO SHAFT ENGINE WITH ACOUSTICAL COMPRESSION FLOW AMPLIFYING RAMJET

CROSS-REFERENCE TO PREVIOUSLY FILED APPLICATIONS

This application is a continuation-in-part of application Ser. No. 10/054,501 filed on Jan. 22, 2002, U.S. Pat. No. 6,647,709, which is a continuation-in-part of application Ser. No. 09/778,340 filed on Feb. 7, 2001, U.S. Pat. No. 6,457,305.

BACKGROUND OF THE INVENTION

This invention relates generally to turbine engines and, more particularly, to a turbo shaft engine using an acoustical compression flow amplifying ramjet to move a large volume of air across turbine blades with a small volume of high energy air.

Conventional gas turbine engines operate to compress incoming air to increase its pressure before it is ignited in a combustion chamber. High energy exhaust gases exit the combustion chamber to drive a turbine and are then exhausted from the engine. Existing systems, however, suffer from a myriad of design complexities and limitations such as thermal inefficiency, fuel consumption, and performance and material limitations due to intense heat production during operation.

Therefore, it is desirable to have a turbo shaft engine which utilizes a small amount of highly energized air to move a large amount of incoming air across turbine blades. This limited bum decreases typical thermal inefficiencies and limitations. Further, it is desirable to have a turbo shaft engine that extracts energy from both incoming air and energized motive flows. It is also desirable to have turbo shaft engine that utilizes a ramjet which uses acoustical pulses for sequentially staging multiple flow rate amplifications.

SUMMARY OF THE INVENTION

An improved turbo shaft engine according to the present invention includes a turbine housing defining an inlet opening for receiving an intake flow into an interior chamber. A turbine assembly having a plurality of blades is rotatably mounted in the chamber for rotation by the intake flow. The turbine housing is coupled to a ramjet gas generator having a tubular primary air duct. The air duct defines opposed intake and outlet ports, the intake port receiving the intake flow from the chamber. The gas generator includes a primary inlet passage configured to receive a portion of the intake flow from the primary air duct, the flow direction of the intake flow portion being reversed by an arcuate wall. This flow reversal increases the pressure or density of the intake flow portion. The gas generator includes a primary combustion chamber positioned to receive the intake flow portion and, upon injection of fuel, to ignite the intake flow portion to form a highly energized motive flow. A portion of the motive flow passes as a back-flash into a resonance chamber and causes acoustical waves that pulsatingly draw more intake flow into the combustion chamber, compress it prior to combustion, and expel motive flow back into the air intake port following combustion. Exhausting the high velocity motive flow back into the primary air duct results in a momentum transfer through direct impact with the slower moving intake flow. The air discharged back into the primary air duct may be directed along a discharge guide member having a Coanda profile for efficient mixing. Thus, a large volume of air is moved toward the outlet port using a small volume of high energy air (motive flow). This sequential amplification of intake air is performed efficiently due to the acoustical pulse within the resonance chamber. Flow amplification increases mass air flow and primary fuel combustion efficiency.

A motive flow and a majority of the intake flow are diffused into a secondary combustion chamber for a limited bum combustion. This combustion is accomplished efficiently and with a limited amount of fuel in that the secondary combustion chamber is configured to induce a torroidal vortex during combustion. A majority of the amplified motive flow is passed through an exhaust adapter coupled to the turbine blower housing for rotation of the turbine blades. As the amplified motive flow passes over the blades, it is centrifugally discharged into the atmosphere through an outlet opening.

Therefore, a general object of this invention is to provide an improved turbo shaft engine which moves a large amount of air using a small amount of high energy air.

Another object of this invention is to provide a turbo shaft engine, as aforesaid, which amplifies the energy of an air intake flow through momentum transfer provided by a motive flow reintroduced into a primary air duct following combustion.

Still another object of this invention is to provide a turbo shaft engine, as aforesaid, which extracts energy from the velocity of incoming air for improving low RPM torque output.

Yet another object of this invention is to provide a turbo shaft engine, as aforesaid, which reduces thermal inefficiency by utilizing limited combustion and self-cooling with incoming air.

A further object of this invention is to provide a turbo shaft engine, as aforesaid, which lowers nitrous oxide and other pollutant emissions.

A still further object of this invention is to provide a turbo shaft engine, as aforesaid, which utilizes an acoustical pulse for pumping and compressing an intake air flow into a primary combustion chamber.

A particular object of this invention is to provide a turbo shaft engine, as aforesaid, in which the acoustical pulse for pumping and compressing may be adjusted or tuned by a user.

Another object of this invention is to provide a turbo shaft engine, as aforesaid, in which the discharge of the motive flow back into the primary air duct is efficiently mixed according to a Coanda effect.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 11a is a right side view of the turbo shaft engine as in FIG. 10;

FIG. 11b is a cross-sectional view of the turbo shaft engine taken along line 11b—11b of FIG. 11a;

FIG. 14a is an end view of the gas generator as in FIG. 10;

FIG. 14b is a sectional view of the gas generator taken along line 14b—14b of FIG. 14a showing a single mode combustion chamber configuration with an adjustable nozzle ring configuration; and FIG. 14c is an enlarged detail view of the nozzle ring configuration shown in FIG. 14b.

DESCRIPTION OF THE PREFERRED EMBODIMENT

Figure 1:
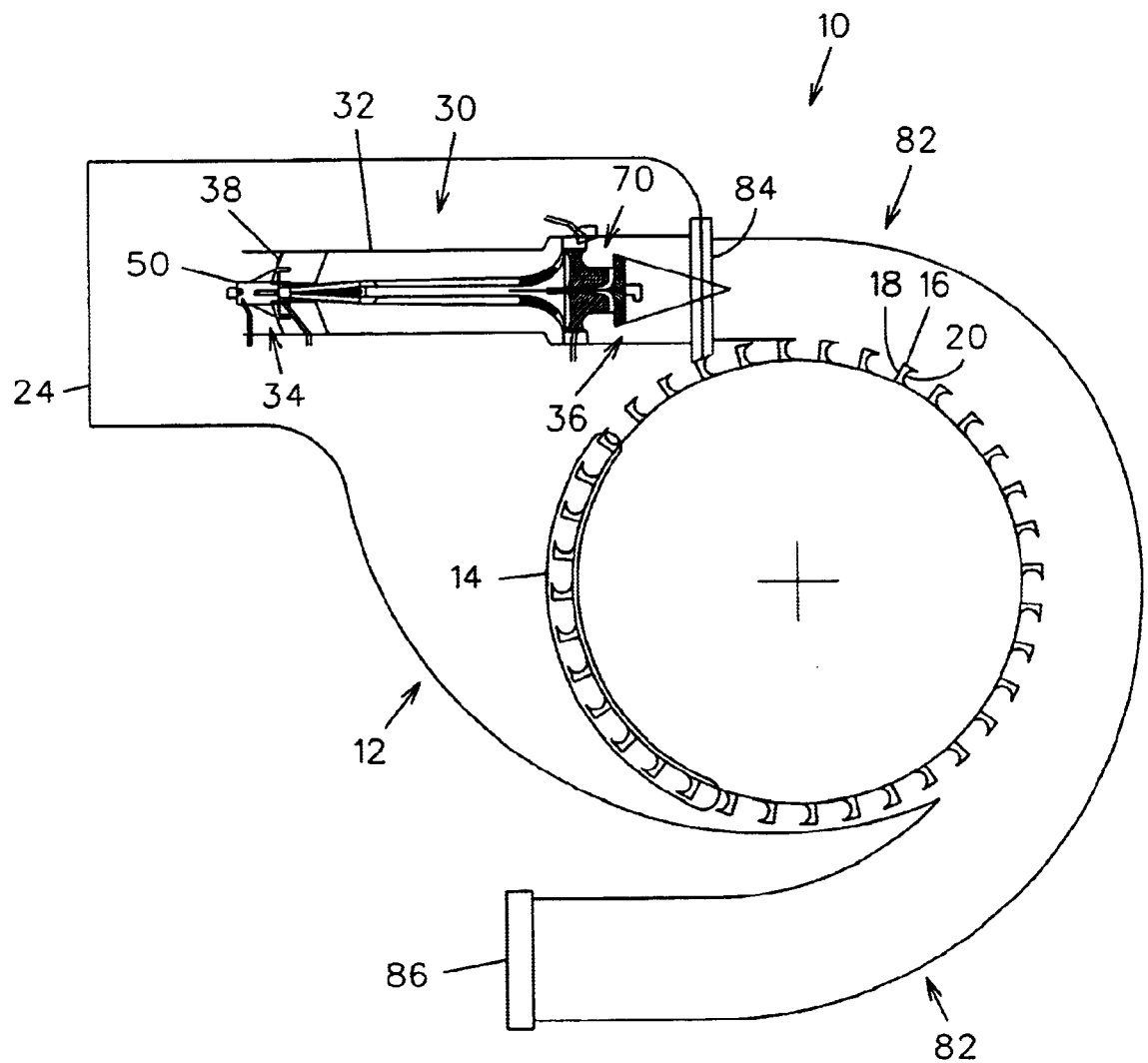
FIG. 1 is a cross-sectional view of a turbo shaft engine according to a preferred embodiment of the present invention.

A turbo shaft engine with an acoustical compression flow amplifying ramjet according to the present invention will now be described with reference to FIGS. 1–7 of the accompanying drawings. A preferred embodiment of the turbo shaft engine 10 includes a blower housing 12 defining an interior chamber and an arc-shaped blower inlet port 14 for receiving an air flow into the chamber (FIG. 1), although inlet ports having other configurations would also be suitable. The blower housing 12 may define blower inlet ports 14 on opposed sides thereof to maximize collection of an air flow from the atmosphere. A turbine fan assembly is rotatably mounted in the chamber and includes a plurality of blades 16 radially extending from a hub in a conventional manner. Each blade 16 includes a front face 18 having a flat surface for direct impact with the air flow flowing into the chamber through a respective blower inlet port 14 (FIG. 1). Each blade 16 further includes a rear face 20 having a concave configuration such that a vortex is induced as air passes across each blade. This blade configuration maximizes the pressure differential across each blade as an air flow passes thereacross. It is understood that the blower inlet ports 14 and turbine blades 16 are positioned such that an incoming air flow directly impacts the front faces 18 of the blades 16. Therefore, maximum torque production may be harvested from the incoming air flow.

Figure 7:
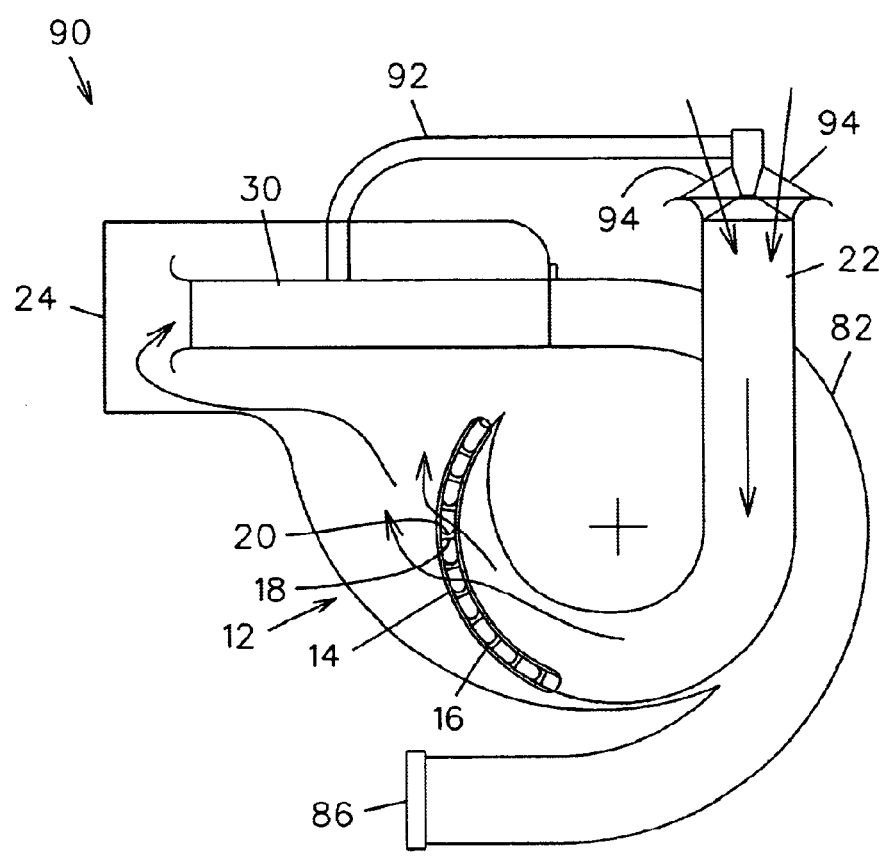
FIG. 7 is a side view of the turbo shaft engine according to another embodiment of the invention.

A tubular air intake channel 22 is associated with each blower inlet port 14 and is fixedly attached to the exterior of the blower housing 12 (FIG. 7). Each channel 22 includes a first end defining an intake opening 94 for receiving an air flow from the atmosphere. Each channel 22 also includes a second end defining an aperture in communication with a respective blower inlet port 14 for transferring the air flow into the housing chamber. Each channel 22 includes a straight tubular configuration toward the first end and gradually curves with a decreasing cross-sectional area toward the second end so as to increase the air flow's velocity as it enters the chamber.

A blower plenum 24 is integrally attached to the blower housing 12 and receives the incoming air flow after it passes across the blades 16. A ramjet gas generator 30 is mounted within the blower plenum 24 and comprises a tubular primary air duct 32 having upstream 34 and downstream 36 ends (FIG. 1). The upstream end 34 of the primary air duct 32 defines an air intake 38 through which the air flow flows into the primary air duct 32 (FIG. 2), this air flow hereafter referred to as the intake flow. The downstream end 36 of the primary air duct 32 defines an outlet port 40.

Figure 2:
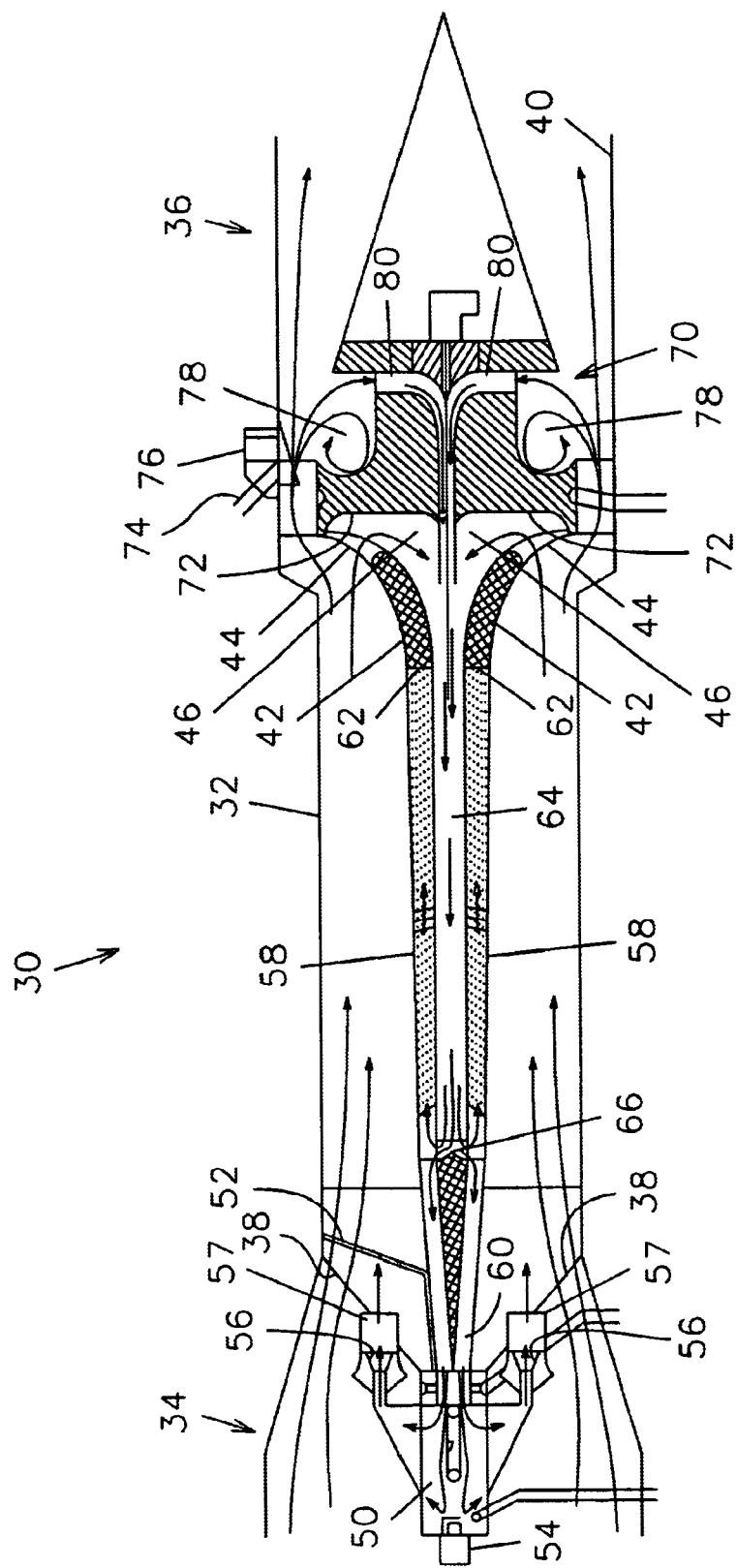
FIG. 2 is a cross-sectional view on an enlarged scale of the gas generator as in FIG. 1.
Figure 3:
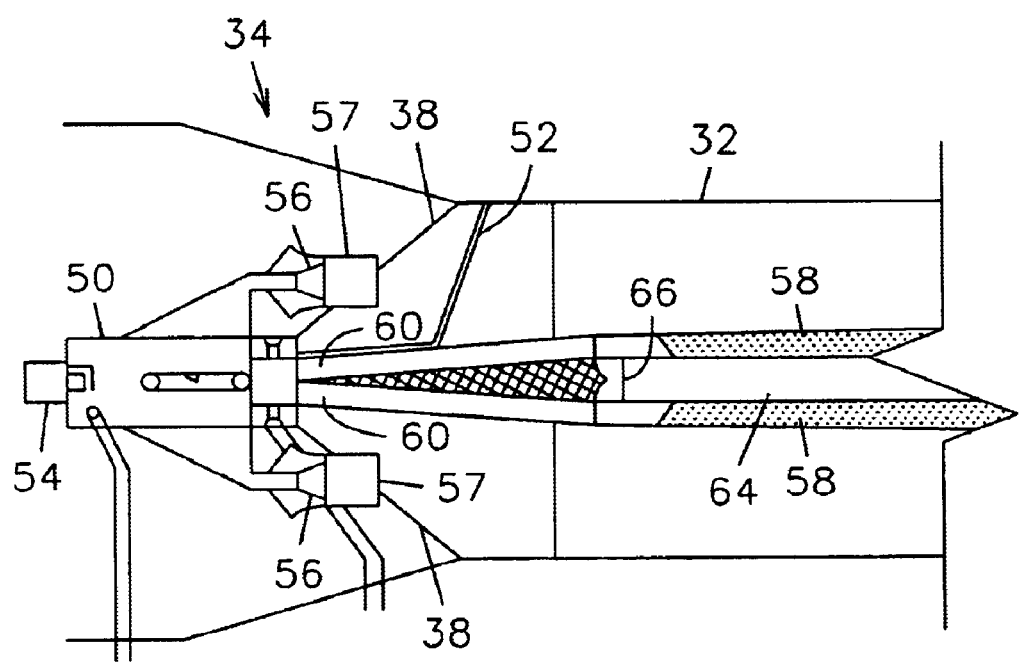
FIG. 3 is a fragmentary view on an enlarged scale of an upstream portion of the gas generator as in FIG. 2.
Figure 4:
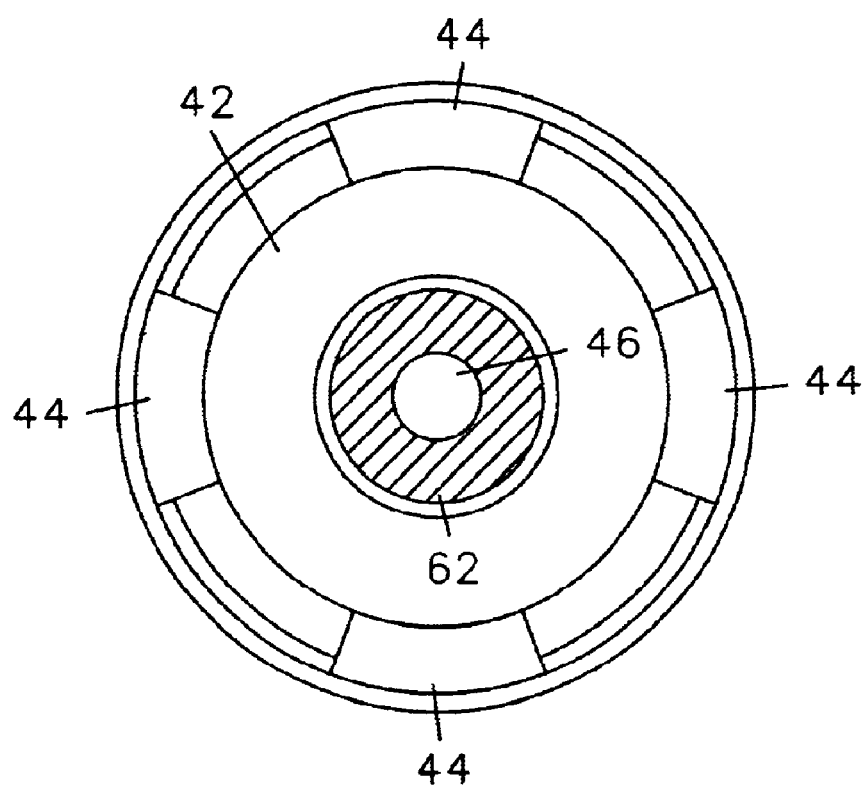
FIG. 4 is an upstream end view of the gas generator as in FIG. 2.
Figure 5:
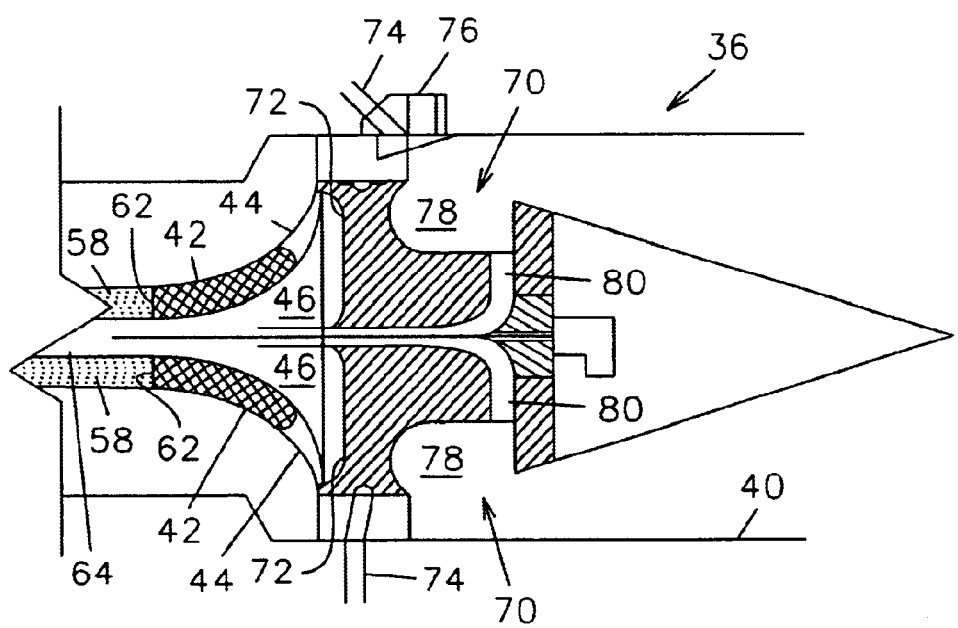
FIG. 5 is a fragmentary view on an enlarged scale of a downstream portion of the gas generator as in FIG. 2.

The gas generator 30 includes a diffuser cone 42 mounted concentrically within a downstream portion of the primary air duct, said diffuser cone being spaced upstream from the outlet port 40 (FIGS. 2 and 5). The diameter of the diffuser cone 42 increases between its upstream and downstream ends so as to diffuse the intake flow outwardly and toward the outlet port 40 as the intake flow passes thereacross. The diffuser cone 42 defines a plurality of primary inlet ports 44 for receiving a portion of the intake flow as it flows downstream (FIGS. 4 and 5). A secondary combustion chamber 70 includes an arcuate wall 72 coupled to and spanning the downstream end of the diffuser cone 42. The arcuate wall 72 operates to reverse the flow direction of the intake flow portion flowing through the primary inlet ports 44. The intake flow portion, once redirected, is received in a primary inlet plenum 46.

A primary combustion chamber 50 is mounted within the upstream end 34 of the primary air duct 32 adjacent to the air intake 38 (FIG. 2). The primary combustion chamber 50 includes a fuel inlet 52 and ignition assembly 54 for operation in a conventional manner. A tubular resonance chamber 58 is concentrically positioned within the primary air duct 32 and includes a first open end 60 in communication with the primary combustion chamber 50 and a second closed end 62 bearing against the upstream end of the diffuser cone 42 (FIG. 2). A primary inlet passage 64 is mounted within the primary air duct 32 and is configured to receive the intake flow portion from the primary inlet plenum 46. The primary inlet passage 64 is concentrically enveloped by the resonance chamber 58, the passage and chamber defining an annular discharge gap 66 at the upstream end of the primary inlet passage 64 through which the intake flow portion may pass into the resonance chamber 58 for transmittal into the primary combustion chamber 50, as to be described in more detail below. The discharge gap 66 is also referred to as a transfer port. Therefore, a small portion of the intake flow is captured by the diffuser cone, directionally reversed, and transferred to the primary combustion chamber 50 for ignition. The discharge gap 66 is formed by a diverter cone 67 positioned intermediate the primary inlet passage 64 and the primary combustion chamber 50. The diverter cone 67 is configured to prevent the back surge of gases from the combustion chamber 50 from back-flowing into the primary inlet passage 64, but rather directs the surge into the resonance chamber 58.

A plurality of ejector nozzles 56 are coupled to the primary combustion chamber 50 with their respective outlets extending into the air intake 38 of the primary air duct 32. Upon ignition of an admixture of fuel and an intake flow portion, high energy exhaust gases are formed, hereafter referred to as a motive flow. The pressure spike resulting from combustion causes about half of the motive flow to be discharged through the ejector nozzles 56 into the air intake 38. The high energy, high velocity motive flow directly impacts the low energy, low velocity intake flow. This impact results in compressive forces and a momentum transfer. Therefore, the flow rate of a large volume of intake flow is increased by a much smaller volume of high energy motive flow. It is understood that some or all of the ejector nozzles 56 may include boost venturis 57 which accelerate the motive flow to an even greater velocity prior to returning it to the primary air duct 32. The pressure spike of combustion causes motive flow not discharged through the ejector nozzles 56 to surge back into the resonance chamber 58 and rebound against the second closed end 62. This causes reciprocating high and low pressure acoustical waves to form. The low pressure experienced at the transfer port 66 as a result of the combustion surge induces a siphon of additional intake flow from the primary inlet passage 64 into the resonance chamber 58. Then, as the acoustical wave rebounds, it pushes and compresses the siphoned intake flow portion into the primary combustion chamber 50 and the cycle repeats. This compression effect further amplifies the energy of the intake flow portion even before combustion occurs. While the resonance chamber 58, inlet passage 64, and combustion chambers 50, 70 have been described as being mounted inside the primary air duct, it should be appreciated that these structures could be mounted outside the primary air duct 32 with appropriate channel connections.

Motive flow and the remainder of the intake flow not entering the primary inlet ports 44 of the diffuser cone 42 is compressed as it is diffused outwardly and into the secondary combustion chamber 70 (FIG. 5). The secondary combustion chamber 70 includes fuel injection 74 and ignition 76 means for combustion of the flows. The configuration of the chamber, however, induces a torroidal vortex of the flow as shown at reference number 78 in FIG. 2. Use of a vortex during combustion heats the flow more uniformly while using less fuel than conventional steady state constant flow combustion means. The secondary combustion chamber 70 defines a pressure bleed channel 80 that taps a portion of the combustion exhaust gases back into the primary inlet passage 64 for further amplification of the intake flow portion. It should be appreciated that the vortex also serves as a dynamic variable nozzle allowing the flow to adjust to current conditions without mechanical means. It also serves to prevent secondary combustion surges by trapping energy in the form of velocity and creating an artificial low pressure to divert combustion gases from progressing forward into the diffuser section.

An exhaust channel 82, also referred to as an exhaust adapter, includes a first open end 84 coupled to the downstream end 36 of the gas generator 30 and a second open end 86 for discharging the motive flow amplified by the secondary combustion chamber 70 (FIG. 1). The exhaust channel 82 is integrally coupled to the blower housing 12 such that the amplified motive flow makes direct contact with the front faces of the turbine assembly blades 16 before being centrifugally discharged from the second end 86.

The flow of air through the turbo shaft engine 10 is particularly indicated in FIGS. 2 and 7 with arrows. In use, an intake air flow is collected from the atmosphere and directed into the blower housing 12 through the intake channel 22 (FIG. 7). The intake channel 22 amplifies the flow rate of the intake air flow by its decreasing diameter. Further, the incoming air flow makes a 90° turn as the blower inlet ports 14 are on the sides of the housing 12. Such a turn converts kinetic energy into impact pressure which contributes to further flow rate amplification. This conversion is how power is extracted from incoming air. As the incoming air flow enters the interior chamber of the housing 12 through the blower inlet ports 14, the blades 16 of the turbine fan assembly are rotated. Thus, energy from incoming air is harvested. The intake flow collects in the blower plenum 24 where it surrounds and cools the ramjet gas generator 30, thus reducing thermal losses and inefficiencies typical with conventional turbo shaft engines.

The intake flow passes into the primary air duct 32 through its upstream air intake 38 and flows downstream toward the diffuser cone 42. A small portion of the intake air flows through primary inlet ports 44 into a primary inlet plenum 46 after its flow direction is reversed while the majority of the intake flow is diffused outwardly and enters a secondary combustion chamber 70. The 180° flow reversal converts kinetic energy into impact pressure which contributes to flow rate amplification. The portion of intake flow from the primary inlet plenum 46 passes through the primary inlet passage 64 into the resonance chamber 58 and into the primary combustion chamber 50. Upon ignition thereof, a portion of the resulting motive flow is discharged back into the primary air duct 32 where it transfers its velocity to incoming intake flow (e.g. a momentum transfer). The rest of the motive flow surges back into the resonance chamber 58 and causes resonating high/low pressure pulses. The diverter cone 67 prevents the back surge from entering the primary inlet passage 64 but instead guides it into the resonance chamber 58. In practical effect, this acts as a gaseous piston pump by alternately siphoning intake flow into the resonance chamber 58 and then forcing it into the primary combustion chamber 50. This acoustical compression aspect provides enhanced efficiency to the amplification cycle.

The motive flow and the remainder of the intake flow are directed into the secondary combustion chamber 70 by the diffuser cone 42. The configuration of this chamber causes a vortex 78 which continues during combustion. This enables a large volume of air to be thoroughly and uniformly combusted with a minimal amount of fuel. Thus, the intake and motive flows are again amplified with minimal thermal inefficiency or limitation. A portion of this amplified flow is injected back into the primary inlet passage 64 through the bleed channel 80 so as to amplify the intake flow therein while the remainder is discharged to the blower housing 12 through the exhaust adapter 82. The turbine blades 16 are rotated by this high energy flow so as to harvest the energy of the outgoing air. The air flow is centrifugally discharged into the atmosphere through the second open end 86.

Another embodiment 90 of the turbo shaft engine is constructed in a manner substantially similar to the preferred embodiment described previously, except as particularly noted below. A tubular combustion pressure tap assembly 92 extends between the primary air duct 32 and an intake opening 94 of a tubular intake channel 22 for amplifying the flow rate of incoming intake air flow through momentum transfer (FIG. 7). This allows additional energy to be harvested from incoming air with no additional heat inefficiencies.

Figure 6:
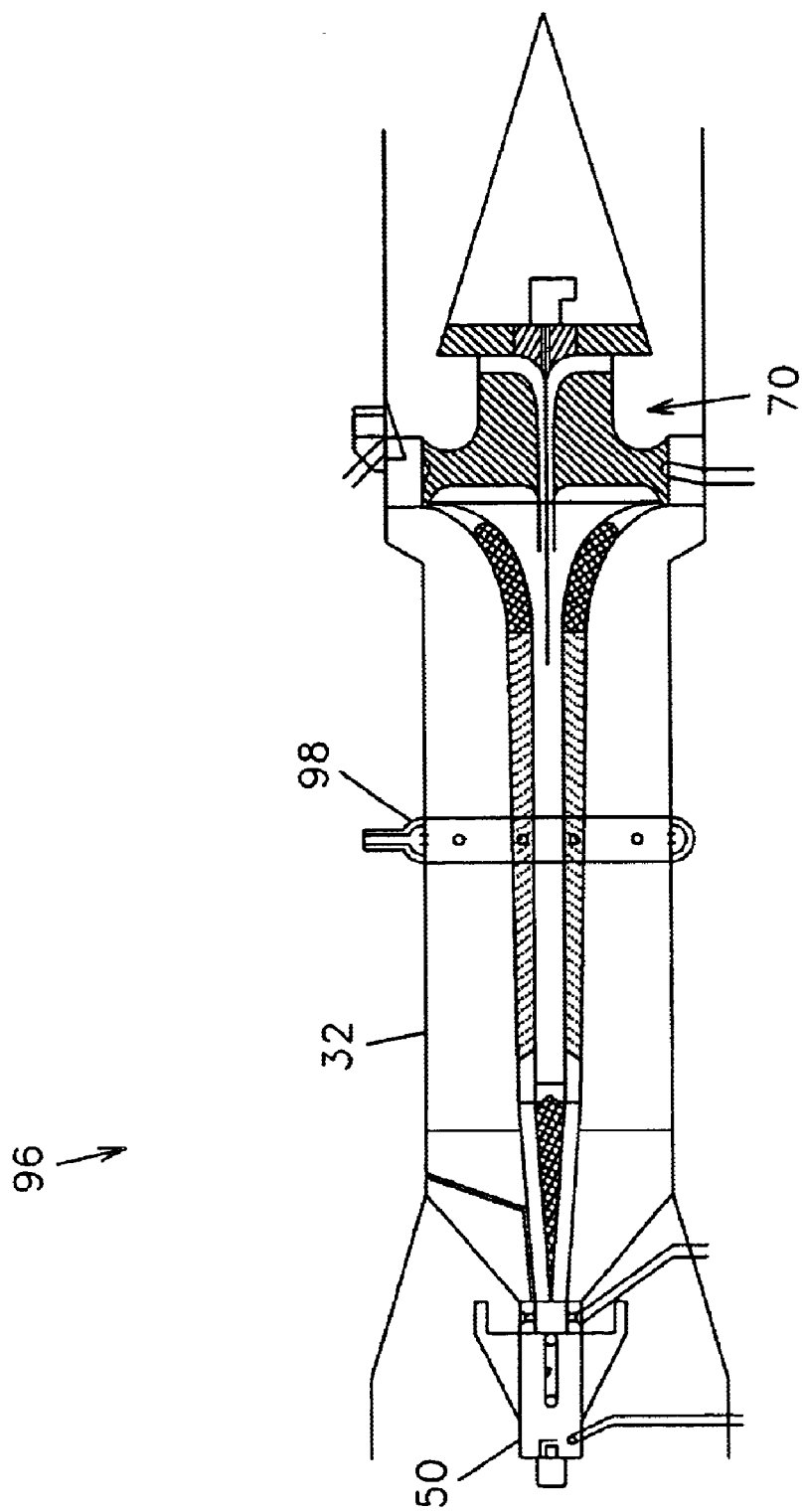
FIG. 6 is a cross-sectional view of a gas generator of a turbo shaft engine according to another embodiment of the invention.

Another embodiment 96 of the gas generator is shown in FIG. 6 that is substantially similar to the embodiment first described above, except as specifically noted below. A supersonic fuel manifold 98 is mounted within the primary air duct upstream from said secondary combustion chamber 70 for injecting high volatility fuel into the motive flow prior to the motive flow reaching the secondary combustion chamber. Early deposition of fuel allows it to vaporize and mix with the air so as to detonate properly when it encounters an oblique shock wave in the secondary combustion chamber.

Figure 8:
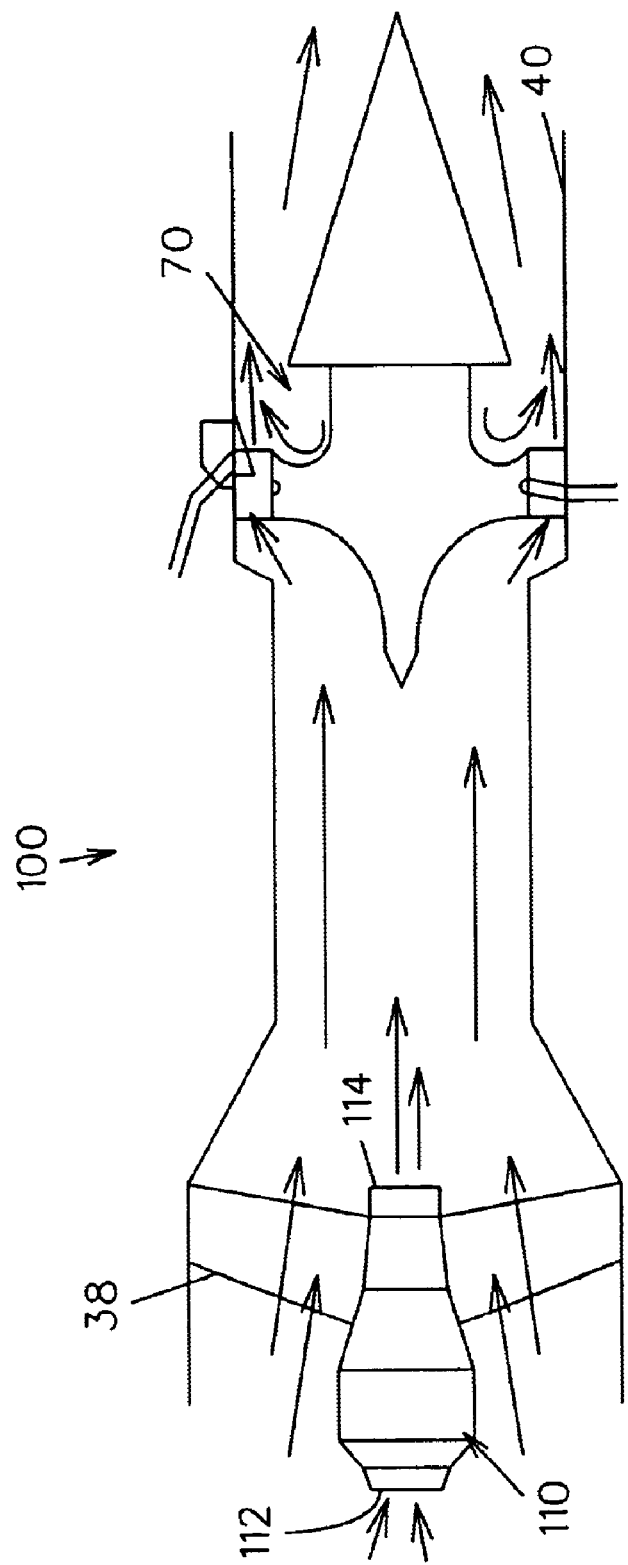
FIG. 8 is a cross-sectional view of a gas generator of a turbo shaft engine according to another embodiment of the present invention.
Figure 9:
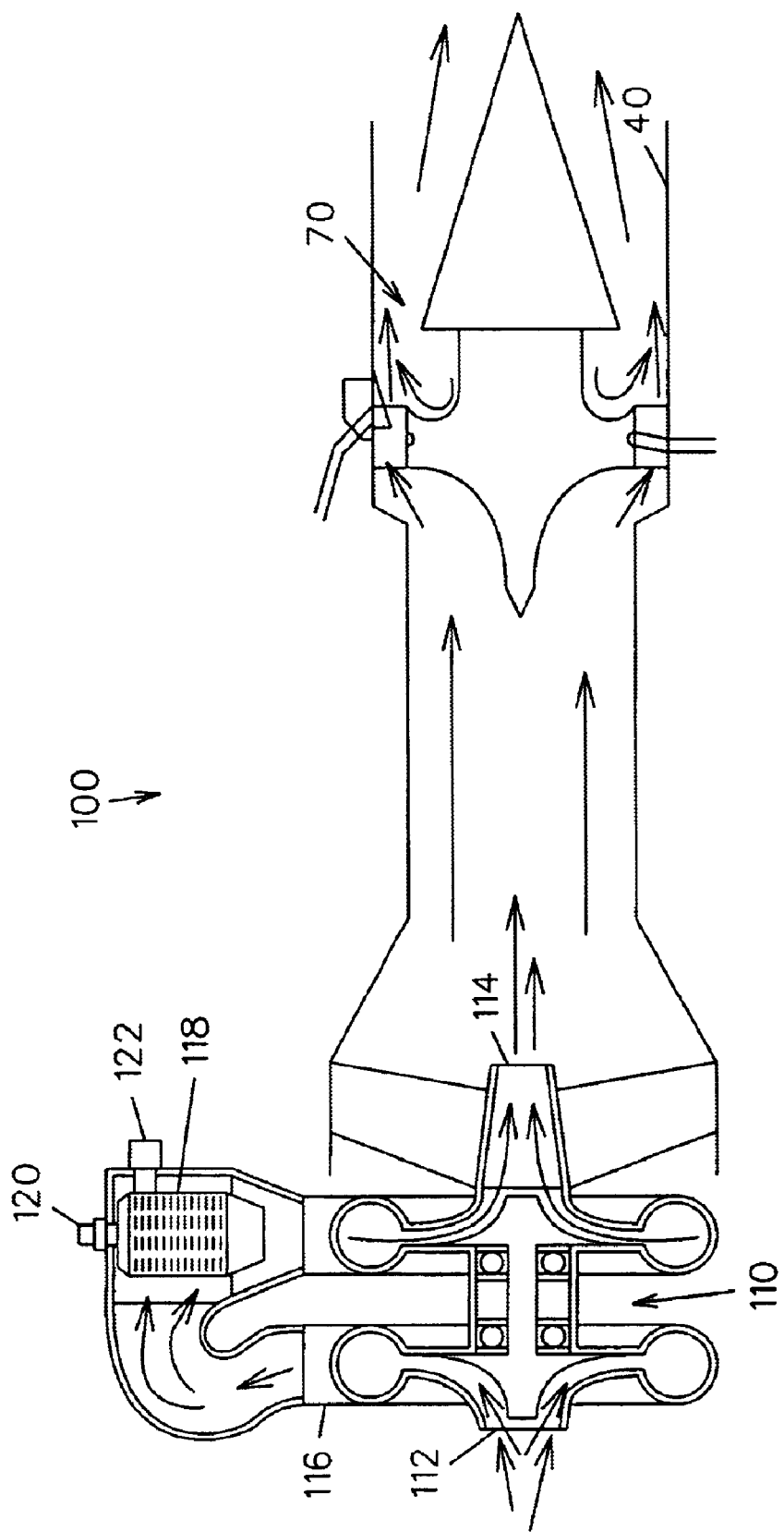
FIG. 9 is a cross-sectional view as in FIG. 8 with the gas turbine shown on an enlarged scale.

Yet another embodiment 100 of the gas generator is shown in FIGS. 8 and 9 and is substantially similar to the embodiment first described above, except as specifically noted below. In this embodiment 100, the gas generator 30 includes a gas turbine 110 mounted in the upstream air intake 38 of the primary air duct 32. The gas turbine 110 defines an inlet 112 for receiving a portion of the intake flow passing through the upstream air intake 38. The gas turbine 110 includes a compressor 116 for compressing the portion of intake flow received through the inlet 112. To this extent, the gas turbine 110 may be a conventional turbocharger. The gas turbine 110 further includes a burner assembly 118 for receiving the compressed air flow. A fuel injector nozzle 120 is connected to the burner assembly 118 for supplying fuel thereto. An igniter 122 is also connected to the burner assembly 118 for igniting a mixture of fuel and compressed air flow. In this regard, the gas turbine 110 operates as a combustion chamber. As the compressed air is combusted, its flow rate is amplified and the amplified air flow is exhausted through an outlet 114 into the primary air duct 32 downstream of the upstream air intake 38 where it mixes with the rest of the incoming air flow and increases the velocity thereof through momentum transfer, as described previously.

Still another embodiment 140 of this invention is shown in FIGS. 10 through 14b and is substantially similar to the embodiment first described above except as specifically noted below. Like reference numerals are used except where variations are noted. This embodiment 140 also includes the turbine fan assembly with blower housing 12 having a construction that is substantially similar to that described previously and which connects to the gas generator 30. The intake flow progresses through the blower housing 12 and into the primary air duct 32 through the air intake 38. Once a portion of the intake flow has been reversed and combusted in the primary combustion chamber 50 (FIGS. 11b and 12b), the resulting high energy motive flow is discharged by an exhaust nozzle 142 back into the primary air duct 32 at a position slightly downstream from the air intake 38.

Figures 11A, 11B:
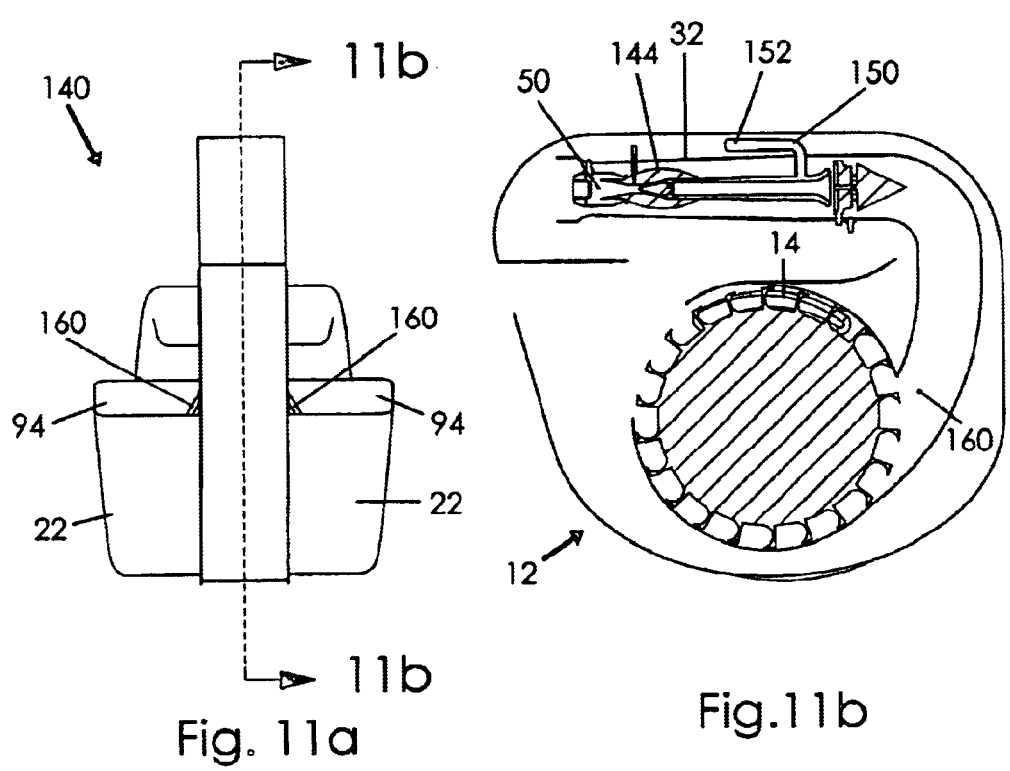
Figure 12B:
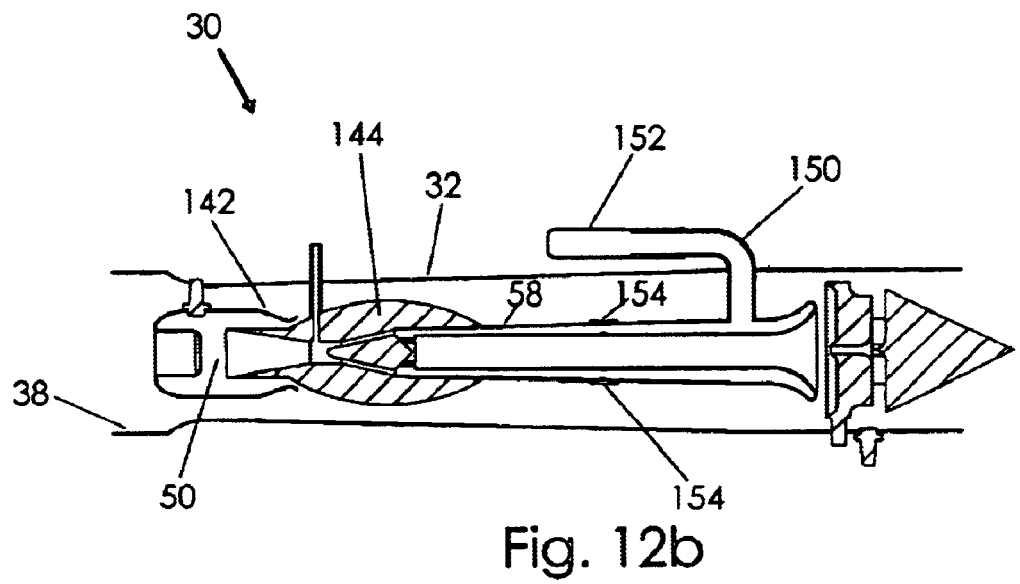
FIG. 12b is a sectional view of the gas generator taken along line 12b—12b of FIG. 12a showing a dual mode combustion chamber configuration.
Figure 12A:
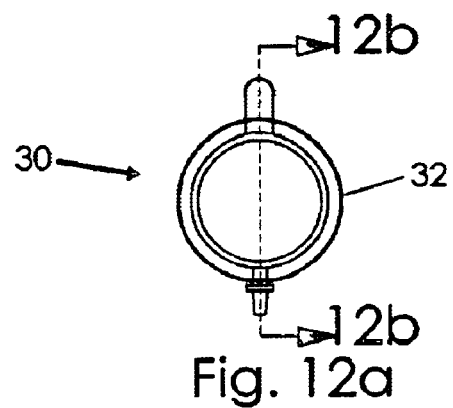
FIG. 12a is an end view of the gas generator as in FIG. 10.
Figure 13B:
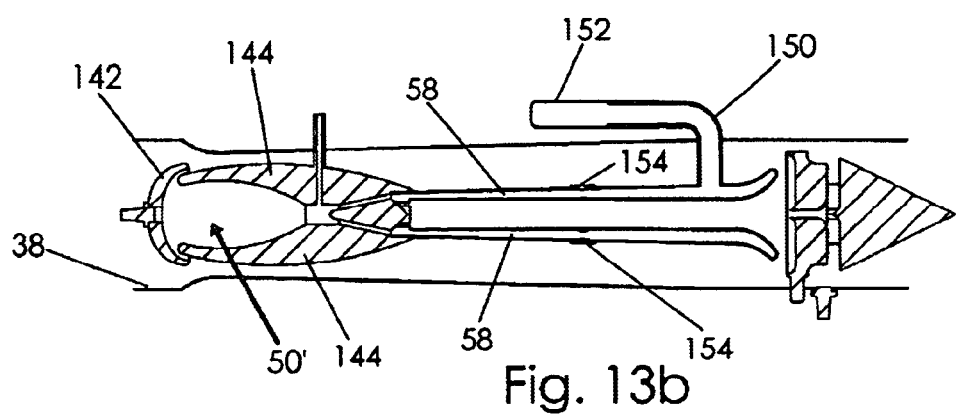
FIG. 13b is a sectional view of the gas generator taken along line 13b—13b of FIG. 13a showing a single mode combustion chamber configuration with annular exhaust nozzle.
Figure 13A:
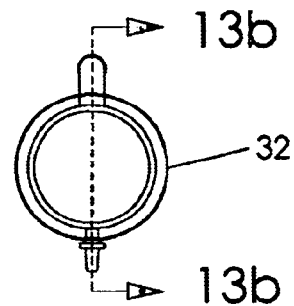
FIG. 13a is an end view of the gas generator as in FIG. 10.

The dual stage combustion chamber of the first described embodiment and shown substantially in FIGS. 11b and 12b may be modified in the present embodiment 140 as follows so as to promote a less turbulent mixing of air streams. The modified configuration is referred to herein as single mode primary combustion chamber and is referenced with numeral 50'. To prevent inefficient mixing of the discharged motive flow with normal intake flow in the primary air duct 32, a special exhaust discharge guide member 144 is positioned to surround or substantially envelop the primary combustion chamber 50' for efficiently mixing these two air streams (FIG. 13b). It is understand that the guide member 144 may also be used with the previously described dual mode combustion chamber 50 (FIG. 11b and FIG. 12b). The guide member 144 includes a Coanda profile configuration. The Coanda effect describes how gases flow around a curve and, more particularly, states that when a gas stream is oriented tangent to the outside of a cylinder, the air stream will follow the profile of the curve for a distance. In the present design, therefore, the motive flow being discharged from the primary combustion chamber 50' through the exhaust nozzle 142 will follow the Coanda profile of the guide member 144 for a distance so as to efficiently mix with the intake flow. Momentum transfer may occur, as described previously, but without introducing airflow inefficiencies, e.g. turbulence, of an uncontrolled mix.

The design of the air inlet 38 is such that maximum static pressure of the atmosphere is available to the primary exhaust as it first travels along the Coanda profile (large diameter opening). The air inlet 38 diameter decreases as the airflow progresses downstream. As the diameter decreases the cross-sectional area decreases and the velocity increases. At its smallest diameter the inlet will have converted the transferred momentum into velocity which lowers the static pressure of the flow of gases. The lower pressure allows the motive flow to detach from the Coanda profile guide member 144 and mix with the primary duct airflows.

As stated above, the Coanda effect is encountered when a gas stream is oriented tangent to a cylinder. The exhaust nozzle 142 includes an annular configuration with a portion thereof being positioned generally parallel to the guide member 144 (FIG. 13b). This configuration causes the discharged motive flow to encounter the guide member 144 tangentially so as to initiate a Coanda effect. The exhaust nozzle 142 may alternatively include a nozzle ring 146 slidably coupled to the primary combustion chamber 50' for selective longitudinal movement relative thereto (FIG. 14b). Slidable movement may be accomplished by communication of slots and attachment bolts, or other suitable slide arrangement. This back and forth movement enables a user to select the amount or flow rate of motive flow discharged back into the primary air duct 32. In practice, the nozzle ring configuration functions as a throttle for increased control and improved combustion.

Figure 10:
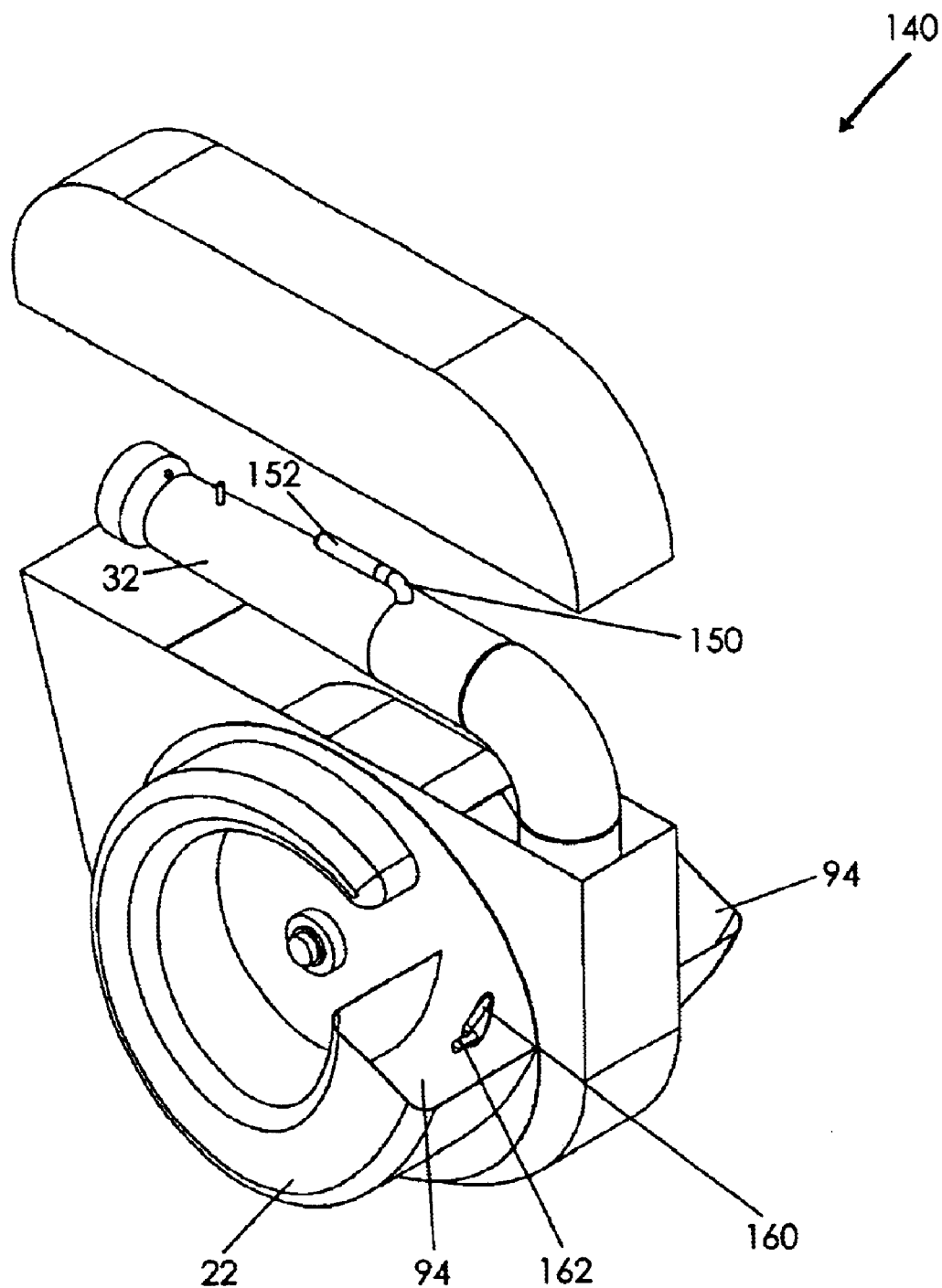
FIG. 10 is a perspective view of a turbo shaft engine according to another embodiment of the present invention with a top case exploded.

Further to the embodiment 140 shown in FIGS. 10–14b, an auxiliary resonance chamber 150 is connected to the previously described resonance chamber 58 (FIGS. 10 and 13b). The auxiliary resonance chamber 150 is preferably connected to the resonance chamber 58 adjacent a downstream end thereof and may have a tubular configuration although other configurations would also be suitable. The auxiliary resonance chamber 150 may extend externally of the primary air duct 32. A slider 152 is coupled to a distal end of the auxiliary resonance chamber 150 and is longitudinally movable therealong for increasing or decreasing the volume of the auxiliary resonance chamber 150. Therefore, the high and low pressure acoustical waves described previously may be "tuned" to a desired frequency by a user's adjustment of the slider 152.

Similar to the function of the slider 152, the resonance chamber 58 may be adjustably vented as another means of tuning the acoustical wave pulse. More particularly, the resonance chamber 58 may define a first plurality of apertures radially spaced apart thereabout. Then a tuning ring 154 is axially mounted about the resonance chamber and defines a second plurality of apertures. The tuning ring 154 is positioned over the first plurality of apertures and is rotatable such that the first and second plurality of apertures are aligned, not aligned, or partially aligned. Therefore, a selectable amount of acoustical waves may be vented for further tuning control. The invention may include either the auxiliary resonance chamber 150 with slider 152 or the tuning ring 154 or both for maximum control.

Also with reference to the embodiment 140 shown in FIGS. 10–14b, a portion of the amplified flow in the primary air duct is diverted to an intake opening 94 of the intake channel 22 for amplifying the intake air flow by momentum transfer. A combustion pressure tap assembly 92 was previously described for this purpose and shown in FIG. 7. The same reference numeral is applied in FIG. 10. As shown more particularly in FIG. 10, a boost nozzle 160 is particularly directed into the air intake opening 94. In addition, a vane 162 having a Coanda profile is positioned in the intake opening 94 immediately downstream of the boost nozzle 160 so as to efficiently mix incoming ambient air and the energized stream being diverted from the primary air duct 32 (FIG. 10).

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A turbo shaft engine for amplifying the flow rate of an air stream, comprising:
   a primary air duct having upstream and downstream ends, said upstream end defining an air intake for receiving an intake flow having a flow rate associated therewith and said downstream end defining an outlet port;
   a primary combustion chamber connected to said primary air duct and adapted to receive a portion of said intake flow and to ignite an admixture of fuel and said intake flow portion so as to form an energized motive flow;
   a primary inlet passage coupled to said primary air duct and positioned to connect said primary air duct with said primary combustion chamber, said primary inlet passage adapted to receive said intake flow portion;
   means positioned between said primary air duct and said primary inlet passage for reversing the flow direction of said intake flow portion;
   an exhaust nozzle for discharging said motive flow into said primary air duct slightly downstream of said air intake so as to amplify said flow rate of said intake flow by momentum transfer, whereby to form an amplified intake flow;
   an exhaust discharge guide member having a Coanda profile positioned in said primary air duct downstream from said exhaust nozzle for efficiently mixing said motive flow with said intake flow; and
   a turbine fan assembly coupled to said outlet port and having a hub with a plurality of blades radially mounted for rotation thereabout, said blades adapted to be rotated by said amplified intake flow and said motive flow flowing through said outlet port.

2. The turbo shaft engine as in claim 1 wherein said exhaust nozzle includes an annular configuration positioned generally parallel to said exhaust discharge guide member for directing said motive flow tangential to said guide member along said Coanda profile thereof.

3. The turbo shaft engine as in claim 1 further comprising:
   a diffuser cone positioned in a downstream portion of said primary air duct having a tapered configuration adapted to direct said motive flow and a remainder of said intake flow toward said outlet port, said diffuser cone defining a plurality of primary inlet ports for communicating said intake flow portion from said primary air duct into said primary inlet passage; and
   wherein said reversing means includes an arcuate wall extending radially across a downstream end of said diffuser cone, said wall adapted to reverse the flow direction of air passing through said primary inlet ports from a downstream flow in said primary air duct to an upstream flow in said primary inlet passage, said reversal amplifying the flow rate of said intake flow portion.

4. The turbo shaft engine as in claim 3 further comprising:
   a resonance chamber concentrically enveloping said primary inlet passage and extending longitudinally between said primary combustion chamber and said diffuser cone, said resonance chamber defining a first open end in communication with said primary combustion chamber and a second closed end adjacent said diffuser cone;
   a transfer port connecting an upstream end of said primary inlet passage with said resonance chamber for communicating said intake flow therebetween; and
   whereby combustion within said primary combustion chamber causes a portion of said motive flow to surge back into said resonance chamber and rebound against said second closed end so as to form high and low pressure acoustical waves therein that alternately siphon said intake flow portion from said primary inlet passage into said transport port and amplify the flow rate thereof into said combustion chamber, respectively.

5. The turbo shaft engine as in claim 4 further comprising:
   an auxiliary resonance chamber connected to said resonance chamber for receiving said motive flow portion from said resonance chamber; and
   a slider coupled to an end of said auxiliary resonance chamber for relative longitudinal movement along said auxiliary resonance chamber for selectively increasing and decreasing a volume of said auxiliary resonance chamber, whereby to regulate a frequency of said high and low pressure acoustical waves in said resonance chamber.

6. The turbo shaft engine as in claim 4 wherein said resonating chamber includes a tubular configuration defining a first plurality of radially spaced apart apertures; and
   said turbo shaft engine further comprising a tuning ring axially mounted about said resonating chamber and defining a second plurality of radially spaced apart apertures, said tuning ring being selectively movable between a first configuration in which said first and second plurality of apertures are aligned, a second configuration in which said first and second plurality of apertures are not aligned, and a third configuration in which said first and second plurality of apertures are partially aligned, whereby to selectively vent said resonating chamber so as to regulate a frequency of said high and low pressure acoustical waves.

7. The turbo shaft engine as in claim 1 wherein said exhaust nozzle is a nozzle ring slidably coupled to said primary combustion chamber for selectably throttling said discharge of said motive flow from said primary combustion chamber into said primary air duct.

8. The turbo shaft engine as in claim 1 further comprising a secondary combustion chamber positioned in said primary air duct downstream from said primary combustion chamber adapted to receive said motive flow and a remainder of said intake flow not received by said primary inlet passage, said secondary combustion chamber adapted to ignite an admixture of fuel and said intake flow remainder and said motive flow so as to form an amplified motive flow.

9. The turbo shaft engine as in claim 8 wherein said secondary combustion chamber is configured to induce a torroidal vortex of said motive flow and said amplified intake flow, whereby to efficiently combust said motive flow and said amplified intake flow using a minimal amount of fuel.

10. A turbo shaft engine for amplifying the flow rate of an air flow, comprising:

a turbine housing defining an interior chamber and an inlet port for receiving an intake flow into said chamber, said intake flow associated with a flow rate;

a turbine blower assembly rotatably mounted in said chamber and having a plurality of blades positioned for rotation by said intake flow;

a primary air duct coupled to said turbine housing and having upstream and downstream ends, said upstream end defining an air intake for receiving said intake flow and said downstream end defining an outlet port;

a primary inlet passage connected to said primary air duct, said primary inlet passage adapted to receive a portion of said intake flow from said primary air duct;

means for reversing the flow direction of said intake flow portion in said primary inlet passage;

a primary combustion chamber coupled to said primary inlet passage for receiving said intake flow portion, said primary combustion chamber adapted to ignite an admixture of fuel and said intake flow portion so as to form a high energy motive flow;

an exhaust nozzle for discharging said motive flow into said primary air duct so as to amplify said flow rate of said intake flow by momentum transfer, whereby to form an amplified intake flow;

an exhaust channel having a first open end coupled to said outlet port for receiving said motive flow and a remainder of said intake flow not received by said primary inlet passage, said exhaust channel adapted to deliver said motive flow and said intake flow remainder into said turbine housing, said blades of said turbine blower assembly being positioned for rotation by said motive flow and said intake flow remainder;

an intake channel comprising:
a first end defining an intake opening adapted to receive said intake flow from the atmosphere;
a second end coupled to said turbine housing and defining an aperture in communication with said inlet port for delivering said air stream into said chamber of said turbine housing;
a combustion pressure tap assembly connecting said primary air duct and said intake opening, for delivering a portion of said motive flow from said primary air duct into said intake opening so as to amplify said intake flow; and
a vane having a Coanda profile positioned in said intake opening for directing said intake flow efficiently into said intake channel.

11. The turbo shaft engine as in claim 10 further comprising an exhaust discharge guide member having a Coanda profile positioned in said primary air duct downstream from said exhaust nozzle for efficiently mixing said motive flow with said intake flow.

12. The turbo shaft engine as in claim 11 wherein said exhaust nozzle includes an annular configuration positioned generally parallel to said exhaust discharge guide member for directing said motive flow tangential to said guide member along said Coanda profile thereof.

13. The turbo shaft engine as in claim 10 further comprising:

a diffuser cone positioned in a downstream portion of said primary air duct having a tapered configuration adapted to direct said motive flow and a remainder of said intake flow toward said outlet port, said diffuser cone defining a plurality of primary inlet ports for communicating said intake flow portion from said primary air duct into said primary inlet passage; and wherein said reversing means includes an arcuate wall extending radially across a downstream end of said diffuser cone, said wall adapted to reverse the flow direction of air passing through said primary inlet ports from a downstream flow in said primary air duct to an upstream flow in said primary inlet passage, said reversal amplifying the flow rate of said intake flow portion.

14. The turbo shaft engine as in claim 13 further comprising:

a resonance chamber concentrically enveloping said primary inlet passage and extending longitudinally between said primary combustion chamber and said diffuser cone, said resonance chamber defining a first open end in communication with said primary combustion chamber and a second closed end adjacent said diffuser cone;

a transfer port connecting an upstream end of said primary inlet passage with said resonance chamber for communicating said intake flow therebetween; and whereby combustion within said primary combustion chamber causes a portion of said motive flow to surge back into said resonance chamber and rebound against said second closed end so as to form high and low pressure acoustical waves therein that alternately siphon said intake flow portion from said primary inlet passage into said transport port and amplify the flow rate thereof into said combustion chamber, respectively.

15. The turbo shaft engine as in claim 14 further comprising:

an auxiliary resonance chamber connected to said resonance chamber for receiving said motive flow portion from said resonance chamber; and a slider coupled to an end of said auxiliary resonance chamber for relative longitudinal movement along said auxiliary resonance chamber for selectively increasing and decreasing a volume of said auxiliary resonance chamber, whereby to regulate a frequency of said high and low pressure acoustical waves in said resonance chamber.

16. The turbo shaft engine as in claim 14 wherein said resonating chamber includes a tubular configuration and defines a first plurality of radially spaced apart apertures; and said turbo shaft engine further comprising a tuning ring axially mounted about said resonating chamber and defining a second plurality of radially spaced apart apertures, said tuning ring being selectively movable between a first configuration in which said first and second plurality of apertures are aligned, a second configuration in which said first and second plurality of apertures are not aligned, and a third configuration in which said first and second plurality of apertures are partially aligned, whereby to selectively vent said resonating chamber so as to regulate a frequency of said high and low pressure acoustical waves.

17. The turbo shaft engine as in claim 10 wherein said exhaust nozzle is a nozzle ring slidably coupled to said primary combustion chamber for selectable longitudinal movement relative thereto, whereby to throttle said discharge of said motive flow from said primary combustion chamber into said primary air duct.

18. The turbo shaft engine as in claim 10 further comprising a secondary combustion chamber positioned in said primary air duct downstream from said primary combustion chamber adapted to receive said motive flow and a remainder of said intake flow not received by said primary inlet passage, said secondary combustion chamber adapted to ignite an admixture of fuel and said intake flow remainder and said motive flow so as to form an amplified motive flow.

19. A turbo shaft engine for amplifying the flow rate of an air stream, comprising:
- a primary air duct having upstream and downstream ends, said upstream end defining an air intake for receiving an intake flow having a flow rate associated therewith and said downstream end defining an outlet port;
- a primary combustion chamber connected to said primary air duct and adapted to receive a portion of said intake flow and to ignite an admixture of fuel and said intake flow portion so as to form an energized motive flow;
- a primary inlet passage coupled to said primary air duct and positioned to connect said primary air duct with said primary combustion chamber, said primary inlet passage adapted to receive said intake flow portion;
- means positioned between said primary air duct and said primary inlet passage for reversing the flow direction of said intake flow portion;
- an exhaust nozzle for discharging said motive flow into said primary air duct slightly downstream of said air intake so as to amplify said flow rate of said intake flow by momentum transfer, whereby to form an amplified intake flow;
- a resonance chamber concentrically enveloping said primary inlet passage, said resonance chamber defining a first open end in communication with said primary combustion chamber and a second closed end;
- a transfer port connecting an upstream end of said primary inlet passage with said resonance chamber for communicating said intake flow therebetween;

whereby combustion within said primary combustion chamber causes a portion of said motive flow to surge back into said resonance chamber and rebound against said second closed end so as to form high and low pressure acoustical waves therein that alternately siphon said intake flow portion from said primary inlet passage into said transport port and amplify the flow rate thereof into said combustion chamber, respectively;

- an auxiliary resonance chamber connected to said resonance chamber for receiving said motive flow portion from said resonance chamber; and
- a slider coupled to an end of said auxiliary resonance chamber for relative longitudinal movement along said auxiliary resonance chamber for selectively increasing and decreasing a volume of said auxiliary resonance, whereby to regulate a frequency of said high and low pressure acoustical waves in said resonance chamber.

20. The turbo shaft engine as in claim 19 further comprising:
- a diffuser cone positioned in a downstream portion of said primary air duct having a tapered configuration adapted to direct said motive flow and a remainder of said intake flow toward said outlet port, said diffuser cone defining a plurality of primary inlet ports for communicating said intake flow portion from said primary air duct into said primary inlet passage; and
- wherein said reversing means includes an arcuate wall extending radially across a downstream end of said diffuser cone, said wall adapted to reverse the flow direction of air passing through said primary inlet ports from a downstream flow in said primary air duct to an upstream flow in said primary inlet passage, said reversal amplifying the flow rate of said intake flow portion.

* * * * *